United States Patent

Smemo

[11] 4,126,059
[45] Nov. 21, 1978

[54] PRESSURE BOOST SYSTEM FOR A POWERSHIFT TRANSMISSION

[75] Inventor: Alfred S. Smemo, Dubuque, Iowa
[73] Assignee: Deere & Company, Moline, Ill.
[21] Appl. No.: 733,319
[22] Filed: Oct. 18, 1976
[51] Int. Cl.² .......................................... F16H 47/00
[52] U.S. Cl. ..................................... 74/730; 192/3.33; 192/87.19
[58] Field of Search ................. 74/730, 732, 731, 733, 74/866, 869; 60/382

[56] References Cited
U.S. PATENT DOCUMENTS
3,951,009  4/1976  Audifferd et al. ................. 74/730 X Primary Examiner—Benjamin W. Wyche
Assistant Examiner—Frank H. McKenzie, Jr.

[57] ABSTRACT

A fixed displacement pump is connected to deliver operating fluid to a torque converter and to a transmission shift control valve that is operable for selectively coupling working fluid to one or more hydraulically operable shift elements of a transmission. A converter pressure regulator valve maintains the pressure of the working fluid at the converter at a predetermined minimum and this pressure prevails generally throughout the system. When the transmission shift control valve is actuated so as to couple one or more shift elements to the pump which require more than the predetermined minimum pressure for acceptable operation, a pilot flow occurs through the shift control valve to actuate a boost valve which activates a main transmission pressure regulating valve so as to cause the pressure of the fluid passing to the one or more shift elements to rise to a level for effecting acceptable operation thereof.

7 Claims, 2 Drawing Figures

PRESSURE BOOST SYSTEM FOR A POWERSHIFT TRANSMISSION

BACKGROUND OF THE INVENTION

The present invention relates to a vehicle transmission including a torque converter and hydraulically operable transmission shift elements.

Powershift transmissions commonly utilize operating fluid at a regulated pressure, generally in the range of 180-200 psi, for effecting engagement of various transmission friction elements such as disc brake and clutch mechanisms. The source of this operating fluid is commonly a fixed-displacement pump operating against a pressure regulating valve for ensuring adequate pressure for operating the transmission shift elements. The pump, then, operates against regulated system pressure and, since the pump also normally supplies fluid for cooling and lubricating the transmission, it is of relatively large displacement. Thus, the power to drive the pump and the resultant heat load is significant.

SUMMARY OF THE INVENTION

According to the present invention, there is provided a novel hydraulic control system for a powershift transmission.

The control system of the present invention includes a pilot pressure-actuatable pressure boost valve connected to the output of a fixed displacement pump, to a sump, to a transmission control valve, which is connected to various pressurizable transmission control elements, and to a pressure boost piston forming part of a main pressure regulating valve and being pressure-shiftable to change the pressure regulating valve from a non-effective to an effective pressure regulating condition. A spring biases the boost valve toward a deactivated position wherein it blocks fluid communication between the pump and transmission control valve while connecting the latter and the pressure boost piston in fluid communication with the sump. The boost valve is shiftable, in response to pilot pressure, to an activated position wherein it connects the transmission control valve and the boost piston in fluid communication with the pump while blocking fluid communication between the sump and the control valve and piston. A pilot pressure line means connects the pump to the boost valve by way of the transmission control valve, the latter being actuable between a neutral position wherein it blocks fluid communication between the pump and boost valve, by way of the pilot pressure line means, and one or more actuated positions wherein it connects the boost valve in fluid communication with the pump. Located downstream of the main pressure regulator valve is a torque converter and located downstream of the torque converter is a converter pressure regulating valve, which, in addition to controlling the pressure at the converter, acts to establish a standby pressure in the system, a pressure considerably less than the pressure required for actuating the transmission control elements, when the main pressure regulating valve is in its noneffective condition, the transmission control valve then being in its neutral position and the boost valve then being in its deactivated position.

An object of the invention is to provide a hydraulic control system for a powershift transmission wherein the pressure of the system is maintained at a relatively low standby pressure until a transmission control valve is actuated to effect a demand for higher pressure.

Another object of the invention is to provide a control system, as described in the immediately preceding object, wherein the system is provided with a main pressure regulating valve including a pressure responsive regulating pressure adjusting means which is deactivated so as to render the main regulating valve ineffective until the transmission control valve is actuated.

A further object is to provide a system, as set forth in the objects above, wherein a torque converter pressure regulating valve establishes the standby pressure of the system and the transmission control valve is used to route pilot fluid, at the standby pressure, to actuate a boost valve for controlling a boost piston for activating the main pressure regulating valve for increasing the system pressure when the transmission control valve is actuated.

Yet another object is to connect a one-way valve between the boost valve and boost piston described in the immediately preceding object, for preventing pressure fluctuations upstream of the boost valve from interacting with the boost piston.

These and other objects will become apparent from a reading of the ensuing description together with the appended drawings.

DESCRIPTION OF THE PREFERRED EMBODIMENT

Figure 1:
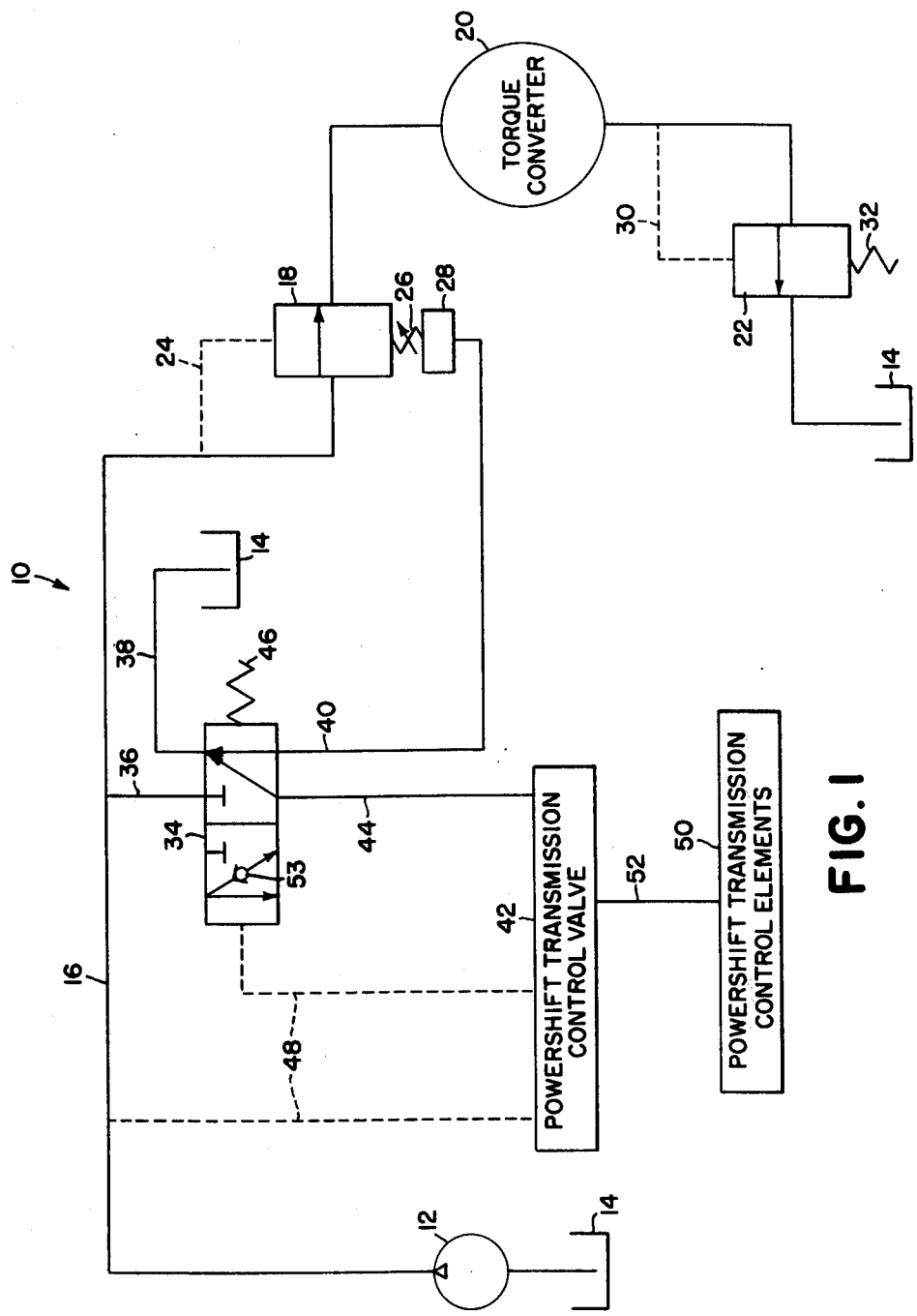
FIG. 1 is a schematic of the hydraulic control system embodying the present invention.

Referring now to FIG. 1, therein is a schematic showing of a hydraulic control system 10 for controlling the operation of a powershift transmission. It is here noted that the actual system would include various other elements which are not thought necessary for the understanding of the present invention and are omitted for the sake of simplicity.

The system 10 includes a fixed displacement pump 12 having an inlet connected to a sump or reservoir 14 and having an outlet coupled to a working fluid delivery line means 16. Connected in series in the line means 16 are a main pressure regulating valve 18, a torque converter 20, and a converter pressure regulating valve 22, these element being arranged in the order indicated with the valve 22 being connected to the sump 14.

Pilot pressure is conveyed to the top end (FIG. 1) of the valve 18 as indicated schematically by means of a pilot pressure line 24, the pressure acting in opposition to a spring 26, the position of which is adjusted, in a manner described hereinbelow, by means of pressure responsive pressure boost piston, indicated schematically at 28. Similarly, pilot pressure is conveyed to the top of the valve 22 by a pilot line 30 and acts in opposition to a spring 32.

It is here noted that in the absence of actuating fluid being delivered to the piston 28, the spring 26 will be positioned such that the main pressure regulating valve 18 will be ineffective to regulate and the pressure in the line means 16 will be that established by the torque converter pressure regulating valve 22.

Provided for selectively actuating the piston 28 for shifting the spring 26 so as to make the valve 18 effective to regulate pressure is a pilot-operated pressure boost valve 34. The boost valve 34 is connected to the line means 16 by a feed line 36 to the sump 14 by an exhaust line 38, to the boost piston 28 by a supply-return line 40 and to a powershift transmission control valve 42 by a supply-return line 44. The boost valve 34 is a two-position valve and is biased, by means of a spring 46, toward a deactivated position, the position illustrated, wherein the supply-return lines 40 and 44 are connected to the exhaust line 38 and blocked from fluid communication with the feed line 36. The boost valve 34 is shiftable rightwardly (FIGS. 1 and 2) from its deactivated position to an activated position wherein the supply-return lines 40 and 44 are connected to the feed line 36 and blocked from fluid communication with the exhaust line 38.

For the purpose of effecting selected pilot operation of the boost valve 34, there is provided a pilot line means 48 having the control valve 42 located therein between opposite ends thereof, which ends are respectively connected to the line means 16 and to the boost valve 34 such that the pressure delivered by the pilot line means 48 acts in opposition to the spring 46. The control valve 42 may be of any known type including a plurality of selectively shiftable valve elements operable for establishing neutral and actuated conditions in the valve 42 for respectively establishing neutral and one or more drive conditions in a powershift transmission respectively by neutralizing and actuating one or more transmission control elements, such as pressurizable clutch and brake pistons, which are here indicated schematically at 50 and connected to the valve 42 by a line 52. No matter what configuration the valve 42 may actually be, it is to be understood that it acts to establish fluid communication between the line 16 and the boost valve 34 via the pilot line means 48 only when the valve 42 is in a condition for routing pressure fluid to one or more of the transmission control elements 50 to establish a transmission driving condition. So that varying system pressures, such as might occur due to pressure modulating action of brake and clutch mechanisms of the transmission, do not interact with the boost piston 28, a check valve 53 is incorporated in the valve 34 so as to be in a passage connecting the feed line 36 to the supply-return line 40 when the boost valve 34 is in its activated position.

Figure 2:
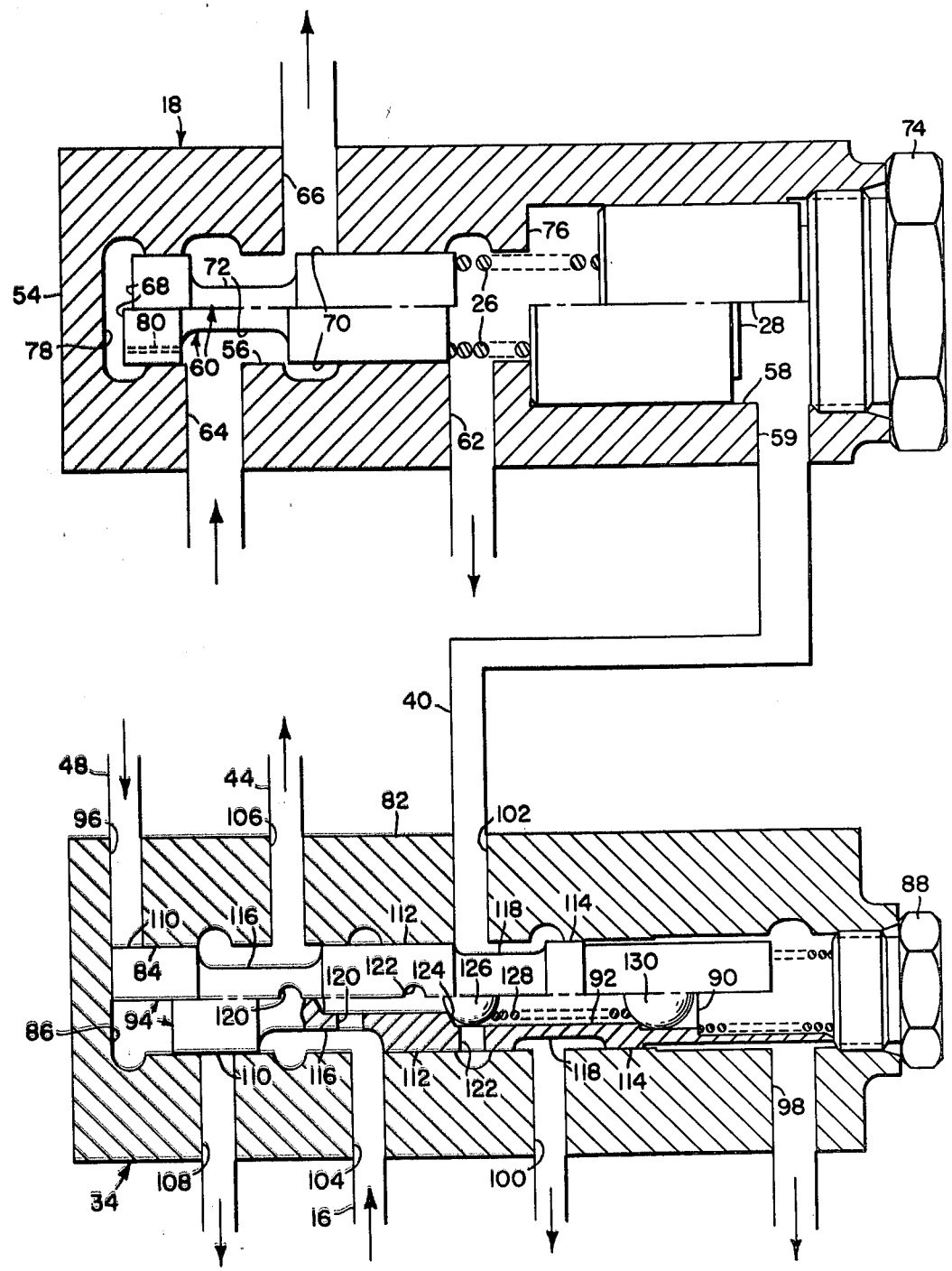
FIG. 2 is a view showing the boost valve and the main pressure regulating valve in section with parts broken away and with certain valve elements divided with one half of each element shown in an actuated position and with the other half of each element shown in an unactuated position.

Referring now to FIG. 2, it can be seen that the main pressure regulating valve 18 includes a valve body 54 having a bore 56 disposed therein and including an enlarged right end defining a cylinder 58 in which is received the boost piston 28. A control port 59 intersects the cylinder 58 rightwardly of the piston 28 and is connected to the supply-return line 40. Disposed in the bore 56 leftwardly of the piston 28 is a valve spool 60 having a right end resting on the spring 26, the latter being in the form of a coil compression spring and mounted between the piston 28 and spool 60. Intersecting the bore 56 so as to always be in fluid communication with a location between the spool 60 and the piston 28 is an exhaust port 62 which is connected to the sump 14. The valve 18 further includes inlet and outlet ports 64 and 66, which are respectively connected to the line means 16 upstream and downstream of the valve 18 and respectively intersect the bore 56 at spaced locations leftwardly of the port 62. The spool 60 includes left and right lands 68 and 70 defining an annular groove 72 therebetween. The lands 68 and 70 of the spool 60 bear such relationship to the ports 62, 64 and 66 that the land 70 blocks fluid communication between the exhaust port 62 and the inlet and outlet ports 66 in all positions of the spool 60 and the groove 72 establishes fluid communication between the inlet and outlet ports 64 and 66 when the spring 26 is uncompressed and the piston 28 is unactuated and rests against an end cap 74 threaded into the right end of the bore 56 (see upper position of spool 60, spring 26 and piston 28 in FIG. 2). Thus, it will be appreciated that when the piston 28 is unactivated the valve 22 will be ineffective to regulate pressure. When the piston 28 is actuated it will move leftwardly against a shoulder 76 and thus relocate the position of the bottom end of the spring 26. In the absence of pilot pressure acting on the spool 60, it would then be held against the top end wall 78 of the bore and the land 70 would block the outlet port 66. However, whenever pressure exists for actuating the piston 28, pilot pressure conveyed to the top end of the spool 60 by a passage 80 extending through the upper land 68 will act to push the spool 60 rightwardly against the force of the spring 26 so as to establish fluid communication between the inlet and outlet ports 64 and 66 (see lower position of the spool 60, spring 26 and piston 28 in FIG. 2).

Also shown in detail in FIG. 2 is the boost valve 34 which includes a housing 82 having a horizontally disposed bore 84 located therein, the bore having its left and right ends respectively closed by an end wall 86 and an end cap 88. The spring 46 is in the form of a coil compression spring mounted in the bore 84 between the end cap 88 and a shoulder 90 defined by a fluid bore 92 extending axially leftwardly into a valve spool 94 reciprocably mounted in the bore 84. Pilot pressure is conveyed to the left end of the spool 94 by means of a pilot pressure port 96 intersecting the left end of the bore and connected to the pilot line means 48 at a location downstream from the transmission control valve 42. To prevent the spool 94 from being hydraulically locked against movement, the right end thereof is connected to the exhaust line 38 by means of an exhaust port 98 intersecting the right end of the bore 84. Intersecting the bore 84 at successive locations leftwardly of the exhaust port 98 are an intermediate exhaust port 100, a supply-return port 102, an inlet port 104, a supply-return port 106 and an exhaust port 108. The exhaust ports 100 and 108 are connected to the line 38, the control port 102 is connected to the line 40, the inlet port 104 is connected to the feed line 36 and the supply-return port 106 is connected to the line 44. For controlling the flow of fluid among the ports 100–108, the spool 94 is provided with left, intermediate and right lands 110, 112, and 114 respectively, with annular grooves 116 and 118 respectively, being located between and defined by the left and intermediate lands 110 and 112 and by the intermediate and right lands 112 and 114.

When the boost valve 34 is in its deactivated position (see upper position of spool 94 and spring 32 in FIG. 2) as occurs when no pilot pressure fluid is conveyed thereto, the spring 46 will hold the left land against the left end wall 86 of the bore 84 and the groove 116 will be disposed to connect the supply-return port 106 to the exhaust port 108. The intermediate land 112 is then positioned in blocking relationship to the inlet port 104 and the groove 118 is positioned to connect the supply-return port 102 to the intermediate exhaust port 100.

When the boost valve 34 is in its activated position (see lower position of spool 94 and spring 32 in FIG. 2)

as occurs when pilot pressure fluid is conveyed thereto, the left land 110 will block the exhaust port 108, the groove 116 will establish fluid communication between the inlet port 104 and a radial passage 120 in the spool 94 connected to the blind bore 92, the blind bore 92 in turn being connected in fluid communication with the supply-return port 102 by way of a second radial passage 122 in the spool 94 connected to the blind bore 92. Located in the bore 92 between the passages 120 and 122 is the check valve 53 which is in the form of a rightwardly facing valve seat 124 defined by the bore 92 and having a check ball 126 biased toward seating engagement therewith by a coil compression spring 128 mounted between the check ball 126 and a spring-retaining ball 130 pressed into the bore 92 such is to also serve as a plug preventing fluid flow therearound.

The operation of the control system is as follows. Assuming the transmission control valve 42 to be in a neutral position or a position where full system pressure is not required, pilot fluid will be blocked by the valve 42 from flowing to the boost valve 34, the latter then being in its unactuated position wherein it connects the boost piston 28 to the sump 14. With the piston 28 connected to the sump 14, the spring 26 will be positioned such that fluid pressure acting on the left end (FIG. 2) of the valve spool 60 will shift the latter rightwardly to interconnect the inlet and outlet ports 62 and 66 without the pressure upstream from the valve having to increase above the regulated pressure of the torque converter pressure regulating valve 22. The valve 18 is thus in effect, deactivated so as to be either subordinate to or at most on par with the valve 22 and the pressure against which the pump 12 is then operating is that determined by the valve 22, this pressure in one known system being in the neighborhood of 40 psi.

If the control valve 42 is then operated to effect the actuation of one or more transmission elements requiring substantially more pressure for their successful operation than the pressure established in the system by the valve 22, the pilot line means 48 will be opened to connect pilot pressure to the left end (FIG. 2) of the boost valve 34. This pressure will urge the spool 94 rightwardly such as to connect the outlet of the pump 12 in fluid communication with the boost piston 28 and the control valve 42, the latter being positioned to connect the supply-return line 44 to the element or elements desired to be actuated. With pressure fluid acting on the piston 28, it is moved leftwardly (FIG. 2) against the shoulder 76 and as it moves leftwardly the right end of the regulating spring 26 will likewise move leftwardly. As a consequence of this leftward movement of the right end of the spring 26, the pressure required to keep the valve spool 60 shifted rightwardly so as to interconnect the inlet and outlet ports 64 and 66 will increase and thus the pressure upstream from the valve 18 will build to the required pressure, which pressure is preselected so as to be that necessary for the successful operation of the actuated transmission element or elements. This required pressure in the aforementioned one known system is typically in the neighborhood of 180-200 psi.

Fluctuations in pressure may occur in the supply line means 16 upstream from the valve 18 due to the modulating action of the actuated transmission control element or elements, however, these fluctuations are kept from disturbing the piston 28 by means of the check valve 53.

Thus, it will be appreciated that by means of the present invention the pump 12 will "stand by" at a relatively low pressure determined by the converter pressure regulating valve 22 until the transmission control valve 42 is shifted to an active position for actuating one or more transmission elements requiring more than the "stand by" pressure for their successful operation.

I claim:

1. A hydraulic fluid control system, comprising: a sump; a pressure regulating valve; a fixed displacement pump having an inlet connected to the sump and an outlet connected to the pressure regulating valve; said pressure regulating valve including pressure-responsive regulating pressure adjusting means operative, in the absence of a control pressure, to effect an inactive-condition in the regulating valve wherein fluid delivered by the pump passes through the regulating valve without being regulated thereby, and operative in the presence of the control pressure to effect an active condition in the regulating valve wherein fluid delivered thereto by the pump is caused to be regulated such that it builds to a predetermined minimum value before passing through the regulating valve; pressure consumer element means; a control valve means; a source of pilot fluid under pressure; a pilot pressure responsive boost valve means; a pilot pressure line means connecting the source of pilot pressure to the boost valve means by way of the control valve means; a supply-return line means connecting the boost valve means to the consumer element means by way of the control valve means; a control fluid line connecting the boost valve means to the regulating pressure adjusting means; a feed line connecting the pump to the boost valve means; an exhaust line connecting the boost valve means to the sump; said boost valve means being pressure-shiftable from an unactuated position wherein it connects the supply-return line means and the control line to the exhaust line, to an actuated position, wherein it connects the feed line to the supply-return means; and said control valve being operable between a first position wherein it blocks the flow of fluid from the source of pilot fluid pressure to the boost valve means and a second position wherein it connects the source of pilot fluid pressure to the boost valve means.

2. The hydraulic fluid control system defined in claim 1 wherein said boost valve means includes one-way valve means for preventing flow from occuring through the control line away from the regulating pressure adjusting means when the boost valve means is in its actuated position.

3. In a system for controlling actuation of fluid-operable powershift transmission elements means requiring a predetermined minimum pressure for their successful operation and including a sump, a supply line means, a fixed displacement pump having an inlet connected to the sump and an outlet connected to the supply line means, a torque converter connected in the supply line means, a converter pressure regulating valve connected in the supply line means downstream from the converter for maintaining a pressure at said converter which is less than said predetermined minimum pressure and a transmission control valve means connected to said pressure-operable transmission control element means and shiftable at least between a neutral and an active position, the improvement comprising: a main pressure regulating valve means connected in the supply line means upstream from the torque converter and including a pressure-responsive regulating pressure adjusting means movable between a deactivated position for setting the regulated pressure at a value no greater than said predetermined minimum pressure and an activated position for setting the regulated pressure at a value sufficient for successfully operating said control element means; a pilot operated boost valve means connected to the supply line means, to the regulating pressure adjusting means, to the sump and to the transmission control valve means; a source of pilot fluid under pressure; pilot line means connecting the last-named source to the boost valve means by way of the control valve means; said control valve means including means for blocking flow through the pilot line means when the control valve means is in its neutral position and for establishing flow through the pilot line means when the control valve means is in its active position; and said boost valve means, in the absence of having pilot fluid flowing thereto, being in a normal position connecting the regulating pressure adjusting means and the control valve means to the sump and being responsive to pilot fluid flowing thereto to shift to an actuated position connecting the supply line to the regulating pressure adjusting means and to the control valve means.

4. A control system for a hydraulic powershift transmission, comprising: a sump; a feed line means; a fixed displacement pump having an inlet connected to the sump and an outlet connected to the feed line means; a torque converter connected in the feed line means; a converter pressure regulating valve connected in the feed line means downstream of the converter for establishing a predetermined minimum operating pressure for the converter; a main pressure regulating valve connected in the feed line means upstream of the converter and including a valve bore intersected by inlet and outlet ports respectively connected in fluid communication with the pump and the converter; said main pressure regulating valve including a valve spool means axially shiftably mounted in the bore for movement between a first and second locations for respectively blocking and establishing fluid communication between the inlet and outlet ports; passage means connecting the pump in fluid communication with the spool means such as to pressure-urge the latter towards its second location; pressure-adjustable biasing means located in the bore and operatively associated with the spool means for resisting movement of the spool means to its second location; said biasing means, in the absence of operating pressure fluid being connected thereto, being in a deactivated condition wherein it offers a resistance to movement of the spool means which can be overcome by a pressure no greater than said minimum operating pressure acting on spool means; and said biasing means, in the presence of operating pressure fluid being connected thereto being in an activated condition wherein it offers a resistance to movement of the spool means which can be overcome only by a second pressure a predetermined amount greater than said minimum operating pressure acting on the spool means; transmission control element means requiring said second pressure for successful operation; a transmission control valve means connected to the control element means and operable at least between first and second conditions for respectively effecting deactuation and actuation of the control element means; a pilot pressure operable boost valve including a valve bore intersected by pilot, inlet, exhaust and supply-return port means; a pilot line means having first and second ends respectively connected in fluid communication with the pump and the pilot port; said control valve means being mounted in the pilot line means and being operable when in its first and second conditions for respectively blocking and establishing fluid flow through the pilot line means; said inlet, exhaust and supply-return port means of the boost valve being respectively connected in fluid communication with the pump, the sump, and the pressure adjustable biasing means and the control valve means; said boost valve further including a valve spool means axially shiftably mounted in the bore for movement between unactuated and actuated positions wherein it respectively connects the supply-return port means to while blocking the inlet port means from the exhaust port means, and connects the supply-return port means to while blocking the exhaust port means from the inlet port means; biasing means urging the spool means of the boost valve to its unactuated position; and said pilot port means being located relative to the spool means such that pressure in the pilot line means will act against the spool means in opposition to the biasing means.

5. The control system defined in claim 4 wherein said pressure-adjustable biasing means includes a coil compression spring and a piston mounted in the bore of the main pressure regulating valve with the spring being positioned between the valve spool means and the piston.

6. The control system defined in claim 4 wherein the supply-return port means of said boost valve includes first and second ports respectively connected to the control valve means and to the pressure-adjustable biasing means; said valve spool means of the boost valve including a spool member provided with a passage means having opposite ends in fluid communication with the inlet port means and second port only when the spool means is in its actuated position, and a check valve means located in said passage means between the opposite ends thereof for permitting flow through the passage means only in the direction of the pressure-adjustable biasing means.

7. The control system defined in claim 6 wherein said check valve means includes an annular valve seat defined by said passage means, a check ball disposed in the passage means for engagement with the seat and a coil compression spring located in the passage means and biasing the ball toward engagement with the seat.

* * * * *